No. 729,428. Patented May 26, 1903.

UNITED STATES PATENT OFFICE.

MATTHEW P. SHAFER, OF VANDERGRIFT, PENNSYLVANIA.

WELDING COMPOUND.

SPECIFICATION forming part of Letters Patent No. 729,428, dated May 26, 1903.

Application filed February 16, 1903. Serial No. 143,659. (No specimens.)

*To all whom it may concern:*

Be it known that I, MATTHEW P. SHAFER, a citizen of the United States, residing at Vandergrift, in the county of Westmoreland and State of Pennsylvania, have invented new and useful Improvements in Welding Compounds, of which the following is a specification.

This invention relates to welding compounds.

The object of the invention is to provide a compound of the class described which in use shall be thoroughly effective in causing perfect and homogeneous welding of like or different kinds of iron together, or of iron to steel, or of steel to steel; furthermore, to provide a welding compound having the above characteristics which shall have the property of restoring burnt iron to its normal condition; furthermore, to provide a welding compound in which the reducing agent therein shall be positively prevented from balling, glassing, or popping, thereby insuring a perfect weld.

With the above and other objects in view, as will appear as the nature of the invention is better understood, the same consists in the novel welding compound hereinafter fully described and claimed.

The welding compound is composed of the following ingredients in substantially the proportions specified by weight: iron or steel chips, shavings, or filings, sixteen parts; sal-ammoniac, four parts; burnt borax, four parts.

In preparing the compound the borax is first burned to a point where when taken between the fingers it can be readily crushed to a powder and after thus being treated is pulverized and mixed with the other ingredients. When employed in welding, the sal-ammoniac acts as a cleansing agent to remove from the iron or steel any surface presentation of sulfur or other matter, the borax acts as a reducing agent, as usual, and the reduced iron operates to cause a homogeneous and perfect weld.

This compound may be employed in welding malleable iron to malleable iron, or machine-steel, or to cast-steel, or to wrought-iron, or for welding steel to steel. If in bringing the metals to the welding-point should either of them be heated to such an extent as to burn it, it may be restored to its normal condition by spreading some of the compound on the burned part and hammering it lightly.

The advantage accruing from the employment of previously-burned borax as a reducing agent over ordinary green borax, such as is commonly employed in compounds of this character, is of the highest importance and is that which renders the compound so peculiarly efficient in use. As is well known, where ordinary refined borax or any other borax is placed on hot metal it will melt and will "glass" or "ball." In this liquefied form the borax contains a certain per cent. of moisture, and this operates to change the heat of the metal, and therefore frequently causes the workmen to make a miscalculation as to the proper degree of heat necessary to produce a perfect weld. Further, when borax is melting or exposed to heat sufficiently to melt it there is present an effervescing or popping action somewhat similar to that observed in popping corn. While this popping action is going on no two pieces of metal can be welded together. Further, as above stated, if the borax glasses it is exceedingly difficult to effect a perfect weld. By previously burning the borax these objectionable features are eliminated, and in use the compound adheres immediately to the parts and results in the production of a more perfect weld. Furthermore, where green or refined borax is used in connection with iron-filings during the melting or effervescing of the borax the iron or steel filings or chips are kept out of contact with the hot metal, and it is essential in the production of a perfect weld where iron or steel filings are employed that there should be an intimate contact at all times between these and the metals to be welded. By the employment of previously-burned borax and the consequent elimination of the effervescing or popping feature of the green borax the steel or iron filings or chips are permitted to rest closely or contact intimately with the metals.

While the proportions of parts herein given are those that have been found thoroughly efficient in use, it is to be understood that these may be varied or changed without departing from the spirit of the invention.

Having thus described the invention, what is claimed is—

1. The herein-described welding compound consisting of iron or steel chips, shavings or filings, sal-ammoniac and burnt borax.

2. The herein-described welding compound consisting of the following ingredients by weight, and substantially in the proportions specified: iron or steel chips, shavings or filings, sixteen parts; sal-ammoniac, four parts; burnt borax, four parts.

In testimony whereof I have hereunto set my hand in presence of two subscribing witnesses.

MATTHEW P. SHAFER.

Witnesses:
CHARLES T. CULP,
JAMES E. SUTTON.